United States Patent
Sridhar (10) Patent No.: US 8,948,061 B2
(45) Date of Patent: Feb. 3, 2015

(54) METHOD OF INTERCEPTING VOIP COMMUNICATIONS

(75) Inventor: Sriram Sridhar, Lowell, MA (US)

(73) Assignee: Google Technology Holdings LLC, Chicago, IL (US)

( * ) Notice: Subject to any disclaimer, the term of this patent is extended or adjusted under 35 U.S.C. 154(b) by 179 days.

(21) Appl. No.: 13/205,655

(22) Filed: Aug. 9, 2011

(65) Prior Publication Data

US 2013/0039226 A1 Feb. 14, 2013

(51) Int. Cl.
*H04L 12/16* (2006.01)
*H04L 29/06* (2006.01)

(52) U.S. Cl.
CPC .......... *H04L 63/306* (2013.01); *H04L 65/1076* (2013.01); *H04L 65/1083* (2013.01)
USPC .......................................... 370/266; 370/270

(58) Field of Classification Search
None
See application file for complete search history.

(56) References Cited

U.S. PATENT DOCUMENTS

| 7,246,171 | B1 * | 7/2007 | Ambrose | 709/233 |
| 7,657,011 | B1 * | 2/2010 | Zielinski et al. | 379/93.02 |
| 8,532,089 | B2 * | 9/2013 | Dalrymple et al. | 370/352 |
| 2004/0240439 | A1 * | 12/2004 | Castleberry et al. | 370/389 |
| 2007/0244628 | A1 * | 10/2007 | Rockett et al. | 701/117 |
| 2009/0034510 | A1 * | 2/2009 | Smoyer et al. | 370/352 |
| 2009/0141883 | A1 * | 6/2009 | Bastien | 379/213.01 |
| 2010/0082839 | A1 * | 4/2010 | Brunson et al. | 709/235 |
| 2010/0150138 | A1 * | 6/2010 | Bjorsell et al. | 370/352 |
| 2011/0141947 | A1 * | 6/2011 | Li et al. | 370/259 |

* cited by examiner

*Primary Examiner* — Kwang B Yao
*Assistant Examiner* — Hardikkumar Patel
(74) *Attorney, Agent, or Firm* — Faegre Baker Daniels LLP (57) ABSTRACT

A method (250) of intercepting a VOIP communication is disclosed. The method (250) includes: detecting (260) whether a subscriber-caller to be monitored goes off-hook; intercepting (270) the subscriber-caller when off-hook, if lawful intercept is authorized; and sending (280) substantially all communications between the subscriber-caller and a subscriber-callee, to a subscriber-agent. Advantageously, this can provide an efficient, useful, repeatable and scalable way to intercept VOIP communications.

15 Claims, 4 Drawing Sheets

METHOD OF INTERCEPTING VOIP COMMUNICATIONS

BACKGROUND

1. Field

The present disclosure relates to a method of intercepting voice over internet protocol (VOIP) communications.

2. Introduction

As is known, many companies have deployed Fiber Optic network to its end customers. It uses VOIP means of VOICE communication via Optical Network terminals (ONT's) and Optical Line terminals (OLT's). Session Initiation Protocol (SIP) is used for signaling between the ONT's. RTP/RTCP is used for exchanging voice data packets over IP.

In Gigabit Passive Optical Networks (GPONs) and Broadand Passive Optical Network (BPONs), the voice traffic is transmitted as Real Time Protocol (RTP) payload. Communications Assistance for Law Enforcement Act (CALEA) is a U.S. wire tapping law. The CALEA concerning Voice over IP packets was issued in the U.S. on or about 2006. The inventor is not aware of a standard or specification for the Lawful Interception of Voice over IP (VOIP) packets. Generally, each operator implements its own proprietary lawful intercept procedures.

The problem with proprietary lawful intercept procedures is that there appears to be an absence of proper or standard procedures defined for doing this. Lawful taps are created on Network Routers, switches or in a Session Border Controller which makes the network providers dependant on these network devices for any wire tapping procedures.

This makes it a less scalable solution and the worse part is setting up the lawful intercepting tap for a particular subscriber. This is not an easy and configurable procedure in VOIP networks. This involves a series of steps in identifying the subscriber's contact information details, such as IP address, and then trying to multicast or clone the RTP packet on a switch side and setting up an RTP relay on the network switch to snoop the RTP packet sent and received from that particular IP address, and intercepting these RTP packets and transmit and store all the VOIP packets for future analysis.

In order to set up a lawful interception of voice packets on a Network Switch, there are several factors that have to be favorable for the Network operator to accomplish this task. VOIP packets need to be relayed, for example, each Switch needs to act as a Back-to-Back User Agent, which is a tedious and labor intensive process and can cause end-to-end delay and packet loss. The additional over head of network processing time also needs to be accounted for.

There is a need to provide a standard procedure for lawful interception of VOIP packets in PONs.

There is also a need to provide a simple and robust wire tapping procedure that can be implemented on the Optical Network Devices, instead of doing it in the network, which can allow a lawful intercept procedure on an interceptor-agent premises via the use of Optical Network Terminals (ONTs), for example.

It would be considered an improvement in the art, if there were a relatively simple, repeatable and scalable method for lawful interception of VOIP communications.

Thus, a method that addresses these issues and problems would be considered an improvement in the art.

To help the reader, a table of commonly used acronyms is provided below.

Table of Acronyms:
BPON Broadband Passive Optical Network
Codec Program that is capable of encoding/decoding a digital media stream
FTTP Fiber To The Premises
GPON Gigabit Passive Optical Network
ITU-T International Telecommunication Union
Jitter A measure of Average variation from the Network Mean Latency
Latency It is a measure of time delay experienced in a System
OLT Optical Line Terminal
ONT Optical Network Terminal
PON Passive Optical Network
POTS Plain Old Telephony Service
RTP Real Time Protocol
RTTP Real-time Transport Protocol
RTCP Real-time Transport Control Protocol
RTCP SR RTCP Sender Reports
RTCP RR RTCP Receiver Reports
SBC Session Border Controller
SDP Session Description Protocol is a format for describing multimedia streams
SID Silence Insertion Descriptor
SIP Session Initiation Protocol
SIP UA SIP User Agent
Voice Switch Switch that controls VOIP call routing and management, such as a CS2K or Broadsoft Switch

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
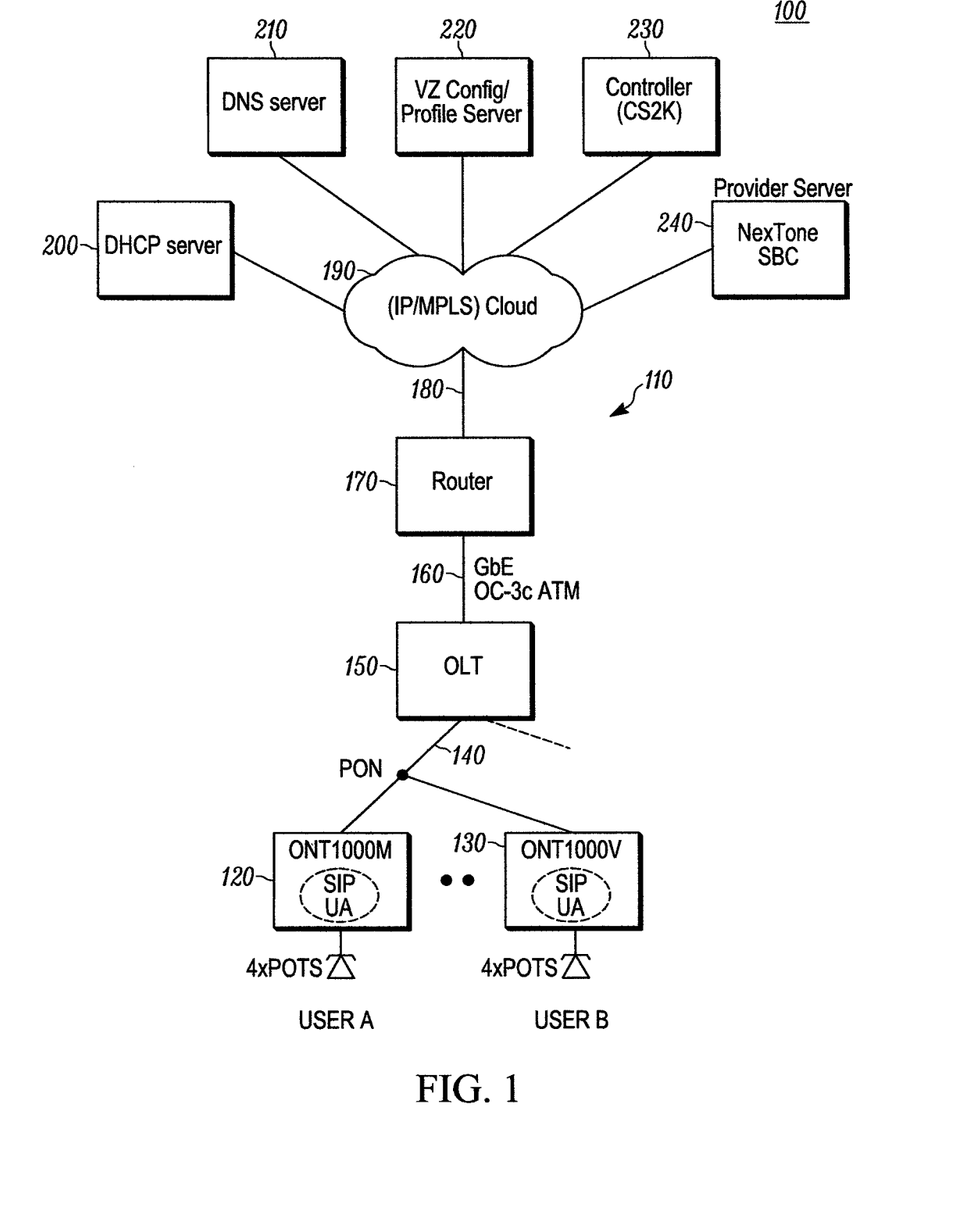
FIG. 1 is an exemplary block diagram of a communication system according to one embodiment.

FIG. 1 is an exemplary block diagram of a system 100 according to one embodiment. The system 100 can include a network 110, a session initiation protocol user agent (SIP UA) terminals 120 and 130, shown as User A and User B, Passive Optical Network (PON) line 140. The line 140 is connected to an OLT 150. The network includes a PON line 160 connecting OLT 150 and router 170. PON line 180 connects the router 170 with a cloud 190, such as an IP/MPLS cloud. The cloud 190 can be connected to and include a plurality of servers, such as a Dynamic Host Configuration Protocol (DHCP) Server 200, a Dynamic Name System (DNS) Server 210, Profile Server 220, Controller 230, such as a Nortel CS2K switch, and Provider Server 240. As should be understood, various servers, routers, switches, controllers, network equipment and the like, can be used as desired.

For example, in one embodiment, the Controller 230 can be a switch which does call control signaling and routing such as a Nortel CS2K switch, and the Provider Server 240 can be a NexTone server. The network 110 may be hardwired, a wireless telecommunications network or a hybrid of both, and can include a cellular telephone network, a Time Division Multiple Access (TDMA) network, a Code Division Multiple Access (CDMA) network, Global System for Mobile Communications (GSM), a Third Generation (3G) network, a Fourth Generation (4G) network, a satellite communications network, and other like communications systems. More generally, network 110 may include a Wide Area Network (WAN), a Local Area Network (LAN) and/or a Personal Area Network (PAN). Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals. In operation, the terminals 120 and 130 can communicate with the network 110 and with other devices on the network 110 by sending and receiving wireless signals, via line 140, which may also comprise local area, and/or personal area access points.

Figure 2:
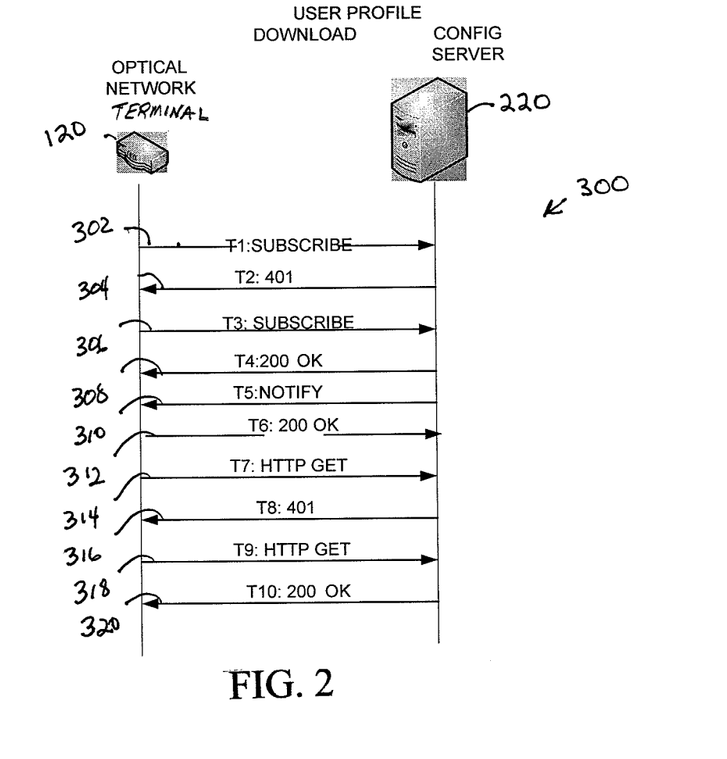
FIG. 2 is an exemplary ladder diagram of a user profile download in connection with a voice over internet protocol communication, according to one embodiment.

Turning now to FIG. 2, an exemplary process flow and exemplary ladder diagram 300 of a user profile download is shown in connection with an ONT 120 and configuration server 220.

At T1 302, ONT 120 sends a SUBSCRIBE request asking the configuration server 220 for a user profile download subscription.

At T2 304, the server 220 challenges the SUBSCRIBE request with a 401 Unauthorized message for the SUBSCRIBE request.

At T3 306, the ONT 120 sends a SUBSCRIBE request with the authorization credentials.

At T4 308, the server 220 accepts the subscription for the user profile download.

At T5 310, the server 220 can send an HTTP URL from which the ONT 120 has to download the user profile.

At T6 312, the ONT 120 acknowledges that it received the NOTIFY request from the server 220.

At T7 314, the ONT 120 initiates a HTTP WEB GET with the URL obtained from the previous step.

At T8 316, the server 220 challenges the ONT 120 request with a 401 message.

At T9 318, the ONT 120 sends the authorization credentials the above HTTP WEB request of T8.

At T10 320, the server 220 accepts with a 200 OK message, the WEB GET request and sends a user profile in XML syntax.

As an example, the 200 OK for WEB GET can have the format, as detailed herein, with the field(s) underlined below, such as FBI Agent's AOR, Agent's RTO IP address and Agent's UDP port.

HTTP/1.1 200 OK
X-Powered-By: Servlet/2.5
Server: Sun GlassFish Communications Server 1.5
Content-Type: text/xml; charset=ISO-8859-1
Content-Length: 3068
Date: Wed, 17 Mar. 2010 17:39:53 GMT
<?xml version="1.0" encoding="UTF-8"?><profile:property_set
  xmlns:xs="http://www.w3.org/2001/XMLSchema"
  xmlns:service="http://sipconfig.verizon.com/service"
  xmlns:profile="http://sipconfig.verizon.com/profile-document"><service: fbi agent_aor>"sip:19788097936@verizon.com"</service: fbi agent_aor>"><service: fbi agent_rtp_ip_addr>"192.172.100.125"</service: fbi agent_rtp_ip_addr>"><service: fbi agent udpport>17400</service: fbi agent_udp_port> . . . <rest of the params . . . > . . . </profile:property_set>

Continuing with the example, the ONT 120 downloads all the configuration profile parameters from server 220 and turns on a "Lawful Intercept" procedure or mode on POTS lines, for example, when it sees that there is a valid Address of Record provisioned in the FBI Agent's AOR, the RTP IP address and port is specified for the FBI agent where the ONT 120 should send the cloned RTP packets that it receives and sends to and from a peer endpoint (callee).

In one embodiment, when the local subscriber-caller who is being monitored goes off-hook and makes an outgoing call, the ONT 120 will try to notify the FBI agent whose Address of Record is already known from the "FBI Agent's AOR" via a SIP INFO message. This can be accomplished, by use of the highlighted text below. Note: a=wiretap:start is added in the SDP for this purpose.

INFO sip:fbi-agent-aor@192.172.100.100 SIP/2.0
From: <sip:9787640403@192.172.100.100>; tag=2e758e8-c0ac731b-13c4-40030-9bf-7fa52116-9bf; user=phone
To: <sip:fbi-agent-aor@192.172.100.100>;user=phone
Call-ID: 2e758e8-c0ac731b-13c4-40030-9bf-440408a1-9bf@192.172.100.100
CSeq: 100 INFO
Via: SIP/2.0/UDP 192.172.115.27:5060; branch=z9hG4bK-9bf-261475-774b09b0
Server: Motorola ONT6000GET SN-MRCC00056EC3 SW-7.2.1 LN-0
Max-Forwards: 70
Content-Type: application/sdp
Content-Length: 246
v=0
o=9787640403 3478417325 3478417325 IN IP4 192.172.115.27
s=Wiretap Call
c=IN IP4 fbi-agent-ip-addr
t=0 0
m=audio rtp-port-of-fbi-agent RTP/AVP 0
a=rtpmap: 0 PCMU/8000
a=sendonly
a=wiretap:start Once, ONT 120 in FIG. 2, receives 200 OK for INFO message, OLT 150 will make a copy of the upstream and downstream RTP packets and send it to the FBI agent's RTP IP address and port. The FBI Agent will be in "Receive" only mode and will keep receiving the RTP packets sent by the subscriber-caller who is being monitored, as detailed herein.

Figure 3:
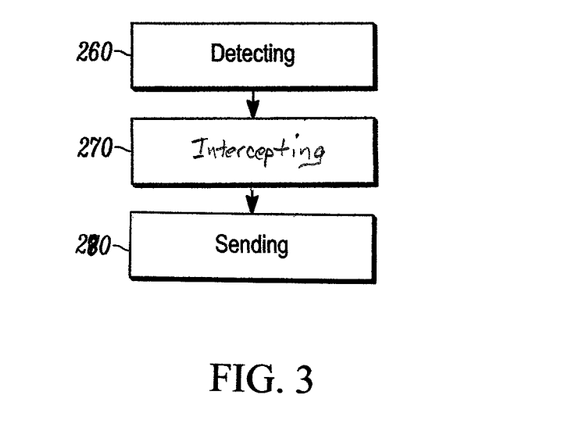
FIG. 3 is an exemplary block diagram of a method of intercepting voice over internet protocol communications, according to one embodiment.

FIG. 3 is an exemplary block diagram of a method of intercepting a VOIP communication. The method 250 includes: detecting 260 whether a subscriber-caller to be monitored goes off-hook; intercepting 270 the subscriber-caller when off-hook, if lawful intercept is authorized; and sending 280 substantially all communications between the subscriber-caller and a subscriber-callee, to a subscriber-agent.

Advantageously, this can provide an efficient, useful, repeatable and scalable way to intercept VOIP communication, as detailed below.

The method 250 can include, when the subscriber-caller goes off-hook, the subscriber-caller includes being configuration profile provisioned by communicating with a configuration server, such as server 220 in FIG. 1. For example, the method 250 can include when the subscriber-caller, such as ONT 120, goes off-hook, the subscriber-caller communicates with a DHCP server 200 and a configuration server 220. In one embodiment, the method 250 further includes when the subscriber-caller goes off-hook, the subscriber-caller communicates with: a DHCP server 200 configured with a DHCP lease and IP address; and then a configuration server 220 configured to download subscriber content information for provisioning an optical network terminal.

In one embodiment, the method 250 further includes determining authorization to intercept by an authorization field in a configuration server. Beneficially, if proper authorization field information is determined, intercept mode is turned on and substantially all VOIP communications can be sent to a subscriber-agent.

In a preferred embodiment, the method 250 includes determining authorization to intercept by an authorization field in a configuration server, the authorization field can include agent of record information, agent IP address information and agent port information. The authorization field can include an agent of record field, an agent IP address field and an agent port field, in a user profile of the agent. This provides multiple pieces of information, for enhanced security.

The method 250 can include the sending step 270 of substantially all communications between the subscriber-caller and a subscriber-callee, to a subscriber-agent, in response to determining authorization to intercept via an authorization field in a configuration server 220, for example. The authorization field can include: an agent of record field, an agent IP address field and an agent port field, as detailed herein.

In one embodiment, upon the determination an intercept is authorized, the subscriber-agent can receive a download and turn on lawful intercept mode, provided determination of valid agent of record information, agent IP address information and agent port information, the information preferably includes a valid agent of record field, an agent IP address field and an agent port field. This provided enhanced security.

The method 250 can include at least one of the subscriber-caller, the subscriber-callee and the subscriber-agent including an Optical Network Terminal. Preferably, the subscriber-agent receives a download and turns on a lawful intercept mode, upon determination of valid agent of record information, agent IP address information and agent port information.

The method 250 can further include notifying the subscriber-agent that a wiretap is to begin in response to the subscriber-caller going off-hook. An example can be a SIP INFO message prompting a subscriber-agent.

The method 250 can include recording communications to the subscriber-agent, for documenting intercepted communications, for example.

The methods shown in FIGS. 1-3, provide a straight forward approach to providing lawful interception of VOIP communications. It also provides and promotes efficient bandwidth consumption.

The method 250 is preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

Figure 4:
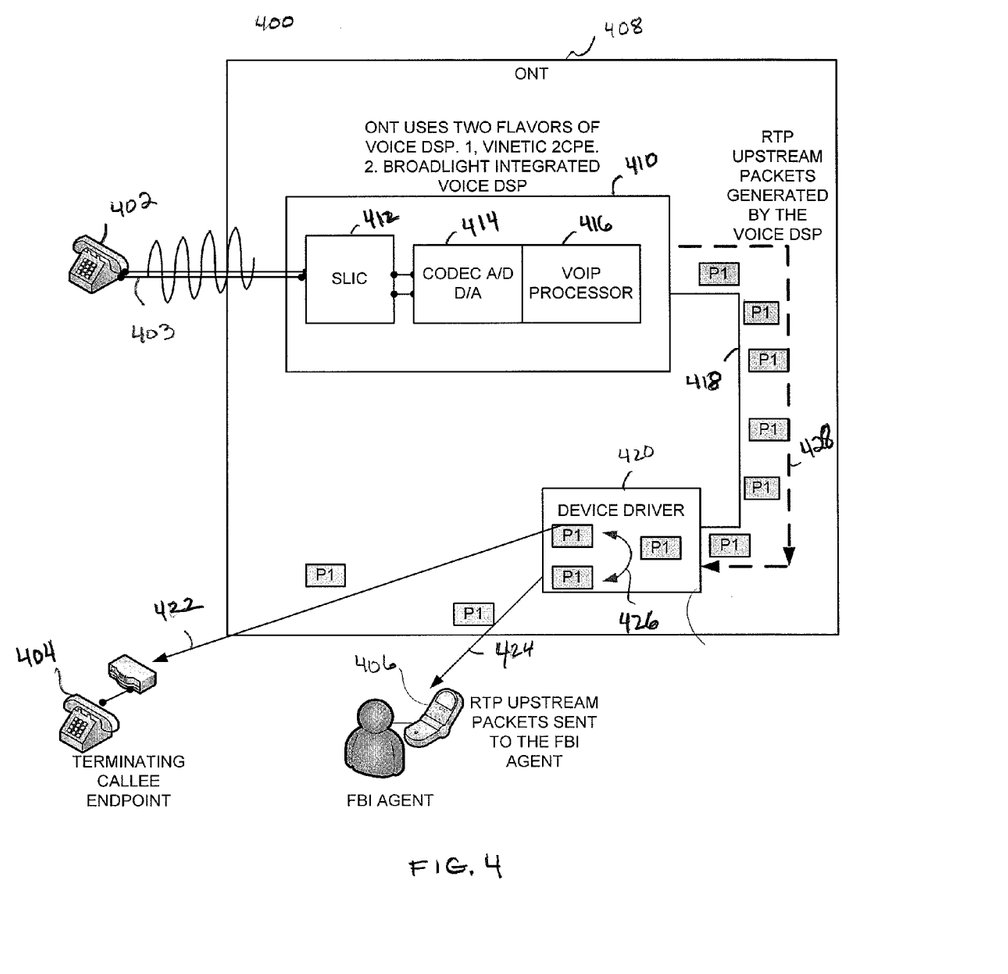
FIG. 4 is an exemplary block diagram of how an RTP upstream packet is generated by a DSP and is cloned into two upstream RTP packets by a device driver module in an ONT, according to one embodiment.

FIG. 4 shows an exemplary block diagram 400 of how an RTP upstream packet is generated by the Voice DSP and is cloned into two upstream RTP packets by the device driver module in the ONT. One RTP packet is sent upstream to the terminating callee endpoint and the other RTP packet is sent to the FBI agent who is monitoring the call.

In more detail, a subscriber-caller 402, a subscriber-callee 404, subscriber-agent 406 are shown connected to ONT 408.

The ONT 408 includes a SLIC 412, Codec 414 and VOIP Processor. The SLIC 412 is a hardware interface to the subscriber-caller 402 that generates off-hook and on hook events. The VOIP processor 416 can be a voice processor which converts analog voice to digital.

The DSP 410 is connected to a device driver 420 through line 418. The device driver 420 can be a software module that controls the VOIP Processor 416 and sends and receives digitized voice through line 418, to (dashed line 432 in FIG. 5) and from (dashed line 428 in FIG. 4) the DSP 410. In FIG. 4, a dashed line 428 shows the direction of RTP packets generated by the DSP 410 to driver 420 through line 418. The driver 420 decides on where to send the voice packets with switch/tap 426 in FIG. 4 and switch/tap 430 in FIG. 5.

Figure 5:
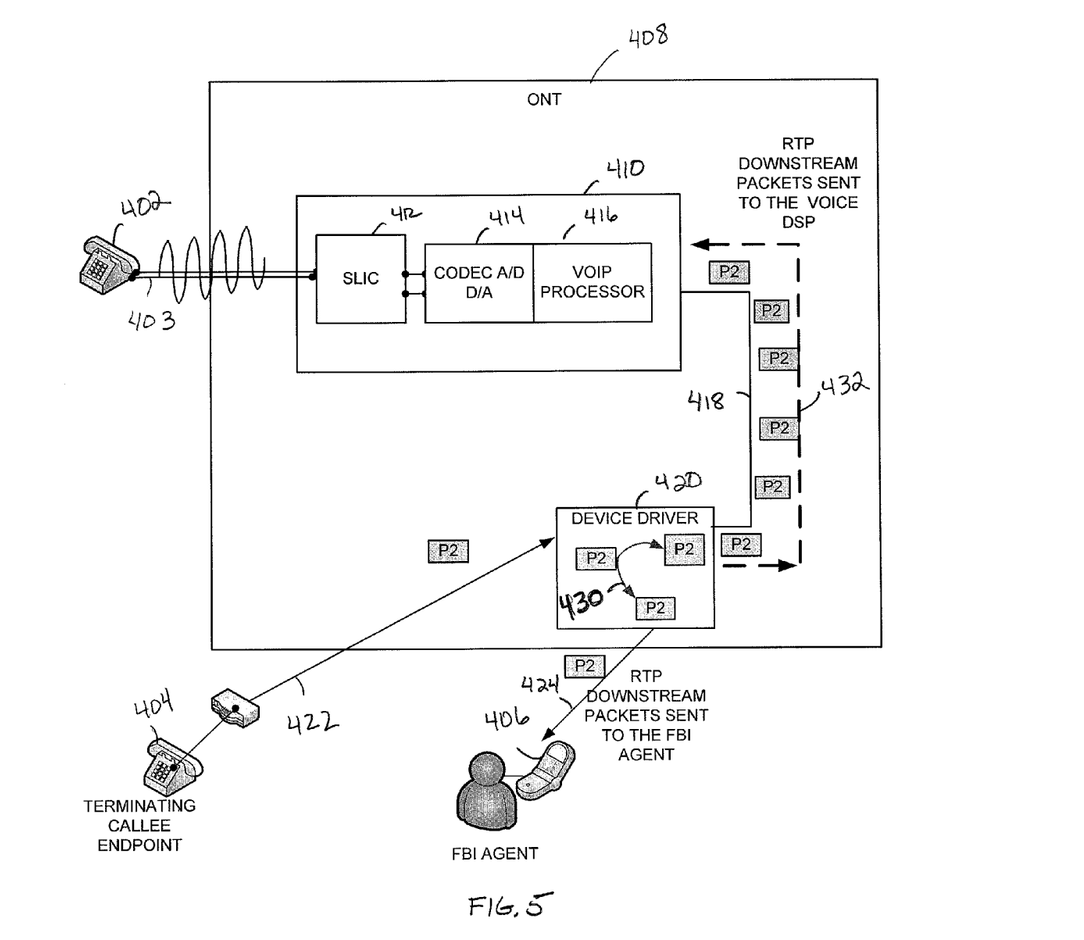
FIG. 5 is an exemplary block diagram of how an RTP downstream packet coming from the outside world is cloned into two RTP packets, and one is fed to a DSP and the other is sent as an RTP upstream packet to a subscriber-agent, according to one embodiment.

FIG. 5 shows an exemplary block diagram 400 of how an RTP downstream packet coming from the outside world is cloned into two RTP packets, and one is fed to the DSP 410 through line 418 in a dashed direction 432 and the other is sent as an RTP upstream packet to the subscriber-agent 406, through line 424.

Once, the subscribe-caller 402 hangs up the call, Optical Network Device will disconnect the call, and stop sending cloned RTP packets to the subscriber-agent's 406 RTP IP address and can send another INFO message to signal that the call is disconnected. This is shown by the highlighted text, detailed below.

Note: a=wiretap:stop is added in the SDP for this purpose.
INFO sip:fbi-agent-aor@192.172.100.100 SIP/2.0
From: <sip:9787640403@192.172.100.100>; tag=2e758e8-c0ac731b-13c4-40030-9bf-7fa52116-9bf; user=phone
To: <sip:fbi-agent-aor @192.172.100.100>;user=phone
Call-ID: 2e758e8-c0ac731b-13c4-40030-9bf-440408a1-9bf@192.172.100.100
CSeq: 100 INFO
Via: SIP/2.0/UDP 192.172.115.27:5060; branch=z9hG4bK-9bf-261475-774b09b0
Server: Motorola ONT6000GET SN-MRCC00056EC3 SW-7.2.1 LN-0
Max-Forwards: 70
Content-Type: application/sdp
Content-Length: 246
v=0
o=9787640403 3478417325 3478417325 IN IP4 192.172.115.27
s=Wiretap Call
c=IN IP4 fbi-agent-ip-addr
t=0 0
m=audio rtp-port-of-fbi-agent RTP/AVP 0
a=rtpmap:0 PCMU/8000
a=wiretap:stop The procedure can be repeated as long as the Optical Network Device is re-provisioned with empty "FBI Agent's AOR" which turns OFF the Lawful Intercept procedure on the ONT's.

The subscriber-agent 406 should be prepared to receive the codec mentioned in the INFO message. Currently, ONT's typically use either G711 or G729 codec's for constructing RTP payload.

EXAMPLE

Detailed is a simplified example. An authorized agent, such as an FBI agent, obtains permission to wiretap a particular telephone number 1234567890. The agent informs the operator and the operator sends a SIP NOTIFY request to the ONT which is connected to the telephone number 1234567890 with the agent AOR, FBI Agent RTP IP address and FBI agent RTP port number (three fields). Next, the ONT reads this agent's information and is set for wiretapping. When the user picks up the telephone connected to the port number 1234567890 and dials some number and establishes an active call, the ONT sends a SIP INFO request to the agent to alert him or her of an active call. The ONT clones each RTP packet sent/received by the user port of 1234567890 and transmits it to the agent AOR, RTP IP and RTP port.

The same holds good when the user connected to the port mapped to 1234567890 telephone number goes off hook to answer an incoming call. Even, in this case, the ONT would alert the agent and would start cloning the incoming and outgoing RTP packets and send it to the agent AOR, RTP IP and RTP port.

Benefits of Implementing this Solution on Optical Network Devices:

Optical Network Devices that are currently deployed have Broadlight SoC 800 MHz MIPS32 4KEC core with higher processing speeds and 128 MB RAM, 500 MHz DDRII. Therefore, cloning an RTP Packet for this wire tapping procedure will have little impact on the performance of the Optical Network devices.

Typically a wire tap would be performed on the Session Border Controller and the procedure of doing so is complicated, time consuming and is dependent on the network service provider. The session Border controller have to be configured to be a Back-to-Back User agent to relay the RTP streams and they have to be continuously snoop the RTP packets sent by the endpoint under wiretap. This would affect the performance of the SBC because it is handling thousands of other VOIP endpoints and RTP traffic and would introduce jitter and end-to-end delay in RTP packets sent/received from the endpoint that is under wire-tap.

Implementing this solution on the Optical Network devices is a simple and more efficient method because there is a formal approach in doing it by provisioning it via a configuration server, and wire tapping it at a customer premises without the knowledge of the subscriber-caller. This will not introduce end-to-end delay in processing of RTP packets and this will not introduce jitter buffer delay.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

The invention claimed is:

1. A method of intercepting voice over internet protocol communications, comprising:
   detecting whether a subscriber-caller to be monitored goes off-hook;
   intercepting the subscriber-caller when off-hook, in response to the intercept being requested by a subscriber-agent and lawful intercept being authorized; and
   determining authorization to intercept by an authorization field in a configuration server, the authorization field including: an agent of record field, an agent IP address field and an agent port field;
   notifying the subscriber-agent that a wiretap is to begin in response to the subscriber-caller going off-hook; and
   sending substantially all communications between the subscriber-caller and a subscriber-callee, to a subscriber-agent, in response to the authorization being determined.

2. The method of claim 1, wherein when the subscriber-caller goes off-hook, the subscriber-caller includes being configuration profile provisioned by communicating with a configuration server.

3. The method of claim 1, wherein when the subscriber-caller goes off-hook, the subscriber-caller communicates with a DHCP server and a configuration server.

4. The method of claim 1, wherein when the subscriber-caller goes off-hook, the subscriber-caller communicates with: a DHCP server configured with a DHCP lease and IP address; and then a configuration server configured to download subscriber content information for provisioning an optical network terminal.

5. The method of claim 1, further comprising determining authorization to intercept by an authorization field in a configuration server.

6. The method of claim 1, further comprising determining authorization to intercept by an authorization field in a configuration server, the authorization field including: an agent of record field, an agent IP address field and an agent port field.

7. The method of claim 5, wherein the agent of record, the agent IP address and agent port information is in a user profile of the agent.

8. The method of claim 1, wherein the sending substantially all communications includes RTP packet information between the subscriber-caller and a subscriber-callee.

9. The method of claim 1, wherein the sending substantially all communications between the subscriber-caller and a subscriber-callee, to a subscriber-agent, in response to determining authorization to intercept via an authorization field in a configuration server.

10. The method of claim 1, wherein the sending substantially all communications between the subscriber-caller and a subscriber-callee, to a subscriber-agent, in response to determining authorization to intercept via an authorization field in a configuration server, the authorization field including: an agent of record field, an agent IP address field and an agent port field.

11. The method of claim 1, wherein the subscriber-agent receives a download and turns on lawful intercept mode, upon determination of valid agent of record information, agent IP address information and agent port information.

12. The method of claim 1, wherein at least one of the subscriber-caller, the subscriber-callee and the subscriber-agent include Optical Network Terminals.

13. The method of claim 1, wherein at least one of the subscriber-caller, the subscriber-callee and the subscriber-agent include Optical Network Terminals, and the subscriber-agent receives a download and turns on a lawful intercept mode, upon determination of valid agent of record information, agent IP address information and agent port information.

14. The method of claim 1, further comprising notifying the subscriber-agent that a wiretap is to begin in response to the subscriber-caller going off-hook.

15. The method of claim 1, further comprising recording communications to the subscriber-agent.

* * * * *

UNITED STATES PATENT AND TRADEMARK OFFICE
CERTIFICATE OF CORRECTION

PATENT NO. : 8,948,061 B2  Page 1 of 1
APPLICATION NO. : 13/205655
DATED : February 3, 2015
INVENTOR(S) : Sriram Sridhar It is certified that error appears in the above-identified patent and that said Letters Patent is hereby corrected as shown below:

In the Claims:

Claim 7, Column 8, line 60, please replace "claim 5" with -- claim 6 --.

Signed and Sealed this
Twenty-first Day of July, 2015

Michelle K. Lee
*Director of the United States Patent and Trademark Office*